United States Patent
Quadakkers et al.

(10) Patent No.: US 6,723,176 B2
(45) Date of Patent: Apr. 20, 2004

(54) COMPONENT COVERED WITH A LAYER AND METHOD OF PRODUCING SUCH A LAYER

(75) Inventors: Willem Quadakkers, Wijnandsrade (NL); Vladimir Shemet, Jülich (DE); Lorenz Singheiser, Jülich (DE)

(73) Assignee: Forschungs zentrum Jülich GmbH, Jülich (DE)

( * ) Notice: Subject to any disclaimer, the term of this patent is extended or adjusted under 35 U.S.C. 154(b) by 6 days.

(21) Appl. No.: 10/122,772

(22) Filed: Apr. 12, 2002

(65) Prior Publication Data

US 2002/0119066 A1 Aug. 29, 2002

Related U.S. Application Data

(63) Continuation-in-part of application No. PCT/DE00/03613, filed on Oct. 13, 2000.

(30) Foreign Application Priority Data

Oct. 14, 1999 (DE) .......................................... 199 49 541

(51) Int. Cl.⁷ ............................................. C23C 14/00

(52) U.S. Cl. ........................ 148/240; 148/281; 148/284; 427/295; 427/372.2; 427/532

(58) Field of Search ................................. 148/240, 243, 148/281, 284, 269; 427/295, 372.2, 532

(56) References Cited

U.S. PATENT DOCUMENTS 5,980,654 A 11/1999 Quadakker .................. 148/421

FOREIGN PATENT DOCUMENTS

| | | |
|---|---|---|
| DE | 197 10 592 | 9/1998 |
| EP | 0 546 756 | 6/1993 |

*Primary Examiner*—Ngoclan T. Mai
(74) *Attorney, Agent, or Firm*—Klaus J. Bach

(57) ABSTRACT

In a method of producing on the surface of a component which consists of a titanium alloy or an intermetallic phase on the basis of titanium, a protective layer (according to the formula $Ti_{5,0-x}Ag_{x+y}Al_{3,0-y}O_2$), a mixture of Ti powder and $TiO_2$ powder, which has been sintered, is applied to the surfaces of the component or, if the titanium alloy includes 40–60 at % Al, a coating of silver is applied to the component and the component is then heat treated at 500 to 900° C. to form the protective layer on its surfaces.

3 Claims, 2 Drawing Sheets

COMPONENT COVERED WITH A LAYER AND METHOD OF PRODUCING SUCH A LAYER

This is a Continuation-In-Part application of International application PCT/DE00/03613 filed Oct. 13, 2000 and claiming the priority of German application 199 49 341.6 filed Oct. 14, 1999.

BACKGROUND OF THE INVENTION

The invention relates to a component covered with a layer, particularly a component consisting of titanium, a titanium alloy and an intermetallic phase on the basis of titanium and to a method of producing such a layer.

Titanium, titanium alloys and intermetallic phases on the basis of titanium have high mechanical strength and, at the same time, a relatively low density. Titanium components are therefore used where a small weight and high-density based strength is required. Such components are particularly airplane and jet engine components, rotating parts in stationary gas turbines, and moving parts such as valves in internal combustion engines.

In comparison with the most important lightweight construction material, which is aluminum, titanium, titanium alloys and intermetallic phases on the basis of titanium have substantially greater strength at high temperatures. As a result, these materials are used, depending on the respective alloy composition, as construction materials for components having operating temperatures of up to about 800° C., whereas aluminum and aluminum alloys can be used only for operating temperatures below about 400° C.

It is, however, an important disadvantage of titanium, titanium alloys and intermetallic phases on the basis of titanium that, at high operating temperatures, their oxidation resistance is insufficient. On contact with oxygen, the components form already at relatively low temperatures rapidly growing surface layers on $TiO_2$ basis so that the operating temperatures for titanium are limited to about 500° C. and the operating temperatures for titanium alloys are limited to about 550° C. The operating temperatures of most intermetallic phases on the basis of titanium (not of some titanium silizides) are limited to 600 to 650° C. By certain alloying procedures, the oxidation resistance can be somewhat improved, but the mechanical properties are detrimentally affected thereby to such a degree that the improved oxidation resistance generally does not result in a larger application range of the components mentioned.

The use of protective layers to avoid the oxidation-based deterioration of components of the groups of materials mentioned is very limited. Conventional protective layers on the basis of NiCoCrAl have an insufficient compatibility with titanium, titanium alloys and intermetallic phases on the basis of titanium. The reason herefor is the difference in the thermal expansion behavior and the formation of brittle phases as a result of diffusion phenomena at the interphase base material/protection layer.

The formation of brittle phases is also the reason that conventional aliting layers are generally not suitable for the protection of the components mentioned from oxidation. Commercial systems, which are based on chromium oxide cover layers are not suitable as protective layers since titanium oxides are thermodynamically more stable than chromium oxide.

It is the object of the present invention to provide a component with a surface layer, which provides for good oxidation and corrosion protection of the component in the temperature range of 500 to 1000° C. It is further the object of the invention to provide a method of producing such a layer on the surface of a component.

SUMMARY OF THE INVENTION

In a method of producing on the surface of a component which consists of a titanium alloy or an intermetallic phase on the basis of titanium, a protective layer (according to the formula $Ti_{5.0-x}Ag_{x+y}Al_{3.0-y}O_2$), a mixture of Ti powder and $TiO_2$ powder, which has been sintered, is applied to the surfaces of the component or, if the titanium alloy includes 40–60 at % Al, a coating of silver is applied to the component and the component is then heat treated at 500 to 900° C. to form the protective layer on its surfaces.

The layer on the surface of the component is an alloy on the basis of $Ti_5Al_3O_2$. It includes small amounts of silver that is amounts of 0.5 to 10 at % particularly in the area of 2 to 5 at %, which partially replaces the titanium. Consequently, the layer is based on a $(Ti,Ag)_5Al_3O_2$ alloy, wherein the replacement of titanium by silver does not occur necessarily stoichiometrically. The oxygen content in this phase may vary between 10 and 22 at % depending on the instant partial oxygen pressure.

Particularly suitable component materials are titanium, titanium alloys, or intermetallic phases on the basis of titanium since, with these materials, the physical and chemical compatibility between the material and the protective layer is very good. However, steel components generally may also be used. The layer according to the invention on the surface of a component forms at temperatures of 500 to 1000° C. a slowly growing cover layer on the basis of $Al_2O_3$ when exposed to oxygen and forms in this way an effective oxidation or, respectively, corrosion protection for the component. The almost gas tight $Al_2O_3$ cover layer prevents the further diffusion of metal or oxygen ions into the layer and/or the component.

In contrast to other Ti containing protection layers in which in air as well as in nitrogen-containing gases conversions to TiAl will often occur (see N. Zheng et al. "Scripta Metallurgica et materialia Vpl. 33(1), 1995, pages 47–53, the layer according to the invention including silver is particularly long-term stable.

The present patent application discloses a method of providing a surface layer on the basis of a $Ti_5Al_3O_2$ compound. The layer has a silver content of 0.5 to 10 at % (atomic percent) particularly a content of 2 to 5 at % which partially replaces the titanium and partially the aluminum.

At % (atomic %) must not be confused with the indices in the sum formula. The basic sum formula $Ti_5Al_3O_2$ indicates 5 atoms Ti, 3 atoms Al and 2 atoms O resulting in the sum of 10 atoms in the compound. This compound however represents 100 at %, that is, all of the atoms of the compound. Therefore the index 5 for titanium (half of the 10 atoms) represents 50 at %. The index 3 for the Al represents 30 at % and the index 2 for the O represents 20 at % in the particular compound.

The disclosed silver content of 0.5 to 10 at % on the basis of the sum formula index is therefore 0.05 to 1.0 (Ag 0.05–1.0) and consequently the indices sum (x+y) is 0.05< (x+y)<1.0.

In connection with the invention, it has been found that chromium further improves the oxidation resistance of the layer. In a particular embodiment of the invention, the layer therefore consists of a composition on the basis of a $(Ti, Ag, Cr)_5Al_3O_2$ alloy. This means that in a Ti—Al oxide compound, titanium is partially replaced not only by Ag, but also by chromium.

Preferably, the chromium content of the layer is in the area of 0.5 to 15 at %, however, particularly in the range of 5 to 10 at %.

These chromium additions affect the oxidation rates in a positive way and provide for a protective layer, which is further improved.

In the listings of the alloy compositions for the layer, typical alloy additives are not represented. Alloy additives are, among others, Nb, Ta, Cr, Mn or Si. These elements may be present in amounts of 1 to 3 at % each.

The method for the manufacture of the layer according to the invention is explained on the basis of examples in connection with the figures. The layers mentioned may be manufactured for example by the following three procedures. (The component to be protected which consists of titanium of a titanium alloy or of an intermetallic phase on the basis of titanium or another component is designated as "base material").

For the manufacture of a layer consisting of a ternary phase on the basis of a (Ti, Ag, Cr)$_5$Al$_3$O$_2$ alloy or a layer layer with a chromium content of 0.5–15 at %, additional chromium materials were used in an analog manner.

In principle, the methods already known such as laser alloying, plasma spraying, spattering are suitable for applying the layer according to the invention on the respective components as well as the PVD process (plasma vapor deposition).

1. Powder metallurgical method

A mixture of Ti powder and TiO$_2$ powder (ratio about 7:3) is sintered at a temperature of 1400–1600° C. (preferably 1550° C.) for 1–100 hrs (preferably 4 hrs) under vacuum (1×10$^{-4}$ bar). The oxygen containing powder obtained thereby is subsequently mixed with Al and Ag in a ratio which is so selected that the final composition corresponds to the ternary phase Ti$_5$Al$_3$O$_2$ with the limitation that a part of the titanium is replaced by Ag in accordance with the concentration listed above (0.5–10 at %, preferably 2–5 at %). In this way, a phase is formed corresponding to (TiAg)$_5$Al$_3$O$_2$, wherein the silver replaces titanium not necessarily in a stoichiometric manner. A typical composition of a protective layer produced thereby would therefore be also Ti$_{4.8}$Ag$_{0.3}$Al$_{2.9}$O$_2$.

From the powder mixture obtained thereby, a layer of typically 5 to 500 μm can be deposited on the base material to be protected by conventional coating procedures, which operate at low oxygen partial pressures (for example, vacuum plasma spraying). The layer thickness depends on the desired operating conditions: high temperatures (800–850° C.) and/or long operating times require a thick protective layer (for example, 200 μm), whereas for lower temperatures (700–750° C.), are sufficient.

2. Alloying technical method

A titanium alloy with 40–60 at % Al, preferably 48–55 at %, and 0.5–10 at % Ag, particularly 1–3 at %, is produced by conventional melt-metallurgical methods.

A typical optimal composition would therefore be 50 at % Al, 2 at % Ag, and 48 at % Ti. The titanium may be replaced, if appropriate partially by alloy additives, which are generally present in intermetallic phases on the basis of TiAl, such as Nb, Ta, Cr, Mn or silicon. The typical content of these elements is at about 1–3 at % if they are added for increasing the strength.

This alloy can subsequently be deposited on the base material in the form of a layer of typically 5–500 μm.

Physical and/or chemical vapor phase deposition (at a low oxygen partial pressure) for example, cathode spattering, Mixing of the alloy to form a powder mixture which is then applied to the base material by plasma spraying at low oxygen pressures (for example vacuum plasma spraying).

The layer of Ti—Al—Ag alloy applied in this way will, at operating temperatures of for example, 500–900° C. automatically form the Ag containing ternary phase Ti$_5$Al$_3$O$_2$ according to the composition as described under 1) by Al depletion at the surface. In this way, the desired protective layer on Al$_2$O$_3$ basis is formed on this surface during high temperature operation.

3. Surface enrichment

If the base material includes a Ti alloy or an intermetallic phase on Ti basis, which has already a high aluminum content (about 40–60 at %), the new protective layer can be formed by enrichment of the base material surface with Ag. To this end, an Ag layer (2–20 μm thickness) is deposited on the base material by conventional processes. Subsequently, the component is heat-treated in an oxygen-depleted environment (protective gas or vacuum) at a temperature of between 700 and 800° C. for 1 to 24 hr.

As a result, the Ag diffuses into the base material surface. During the subsequent high-temperature treatment of the component in an oxygen-containing atmosphere at the surface of the component the desired Ag-containing ternary phase on the basis of Ti$_5$Al$_3$O$_2$ is automatically formed on which subsequently the protective Al$_2$O$_3$ layer is formed.

Long term tests have shown that the layer according to the invention remained stable at temperature of 800° C. for more than 6000 h. The oxidation rate of the layer according to the invention is in this case very small. It is, for example at 800° C. lower than 1×10$^{-12}$ g$^2$/cm$^4$s. under advantageous conditions, it is at these temperatures even less than 10$^{-13}$ g$^2$/cm$^4$s.

The attached figures show test results.

FIG. 2a shows typical base material γ-TiAl after 100 h storage time,

FIG. 2b shows the new protective layer on the basis of Ag-containing ternary phase Ti$_3$Al$_3$O$_3$ after 1000 h storage time.

Figure 1:
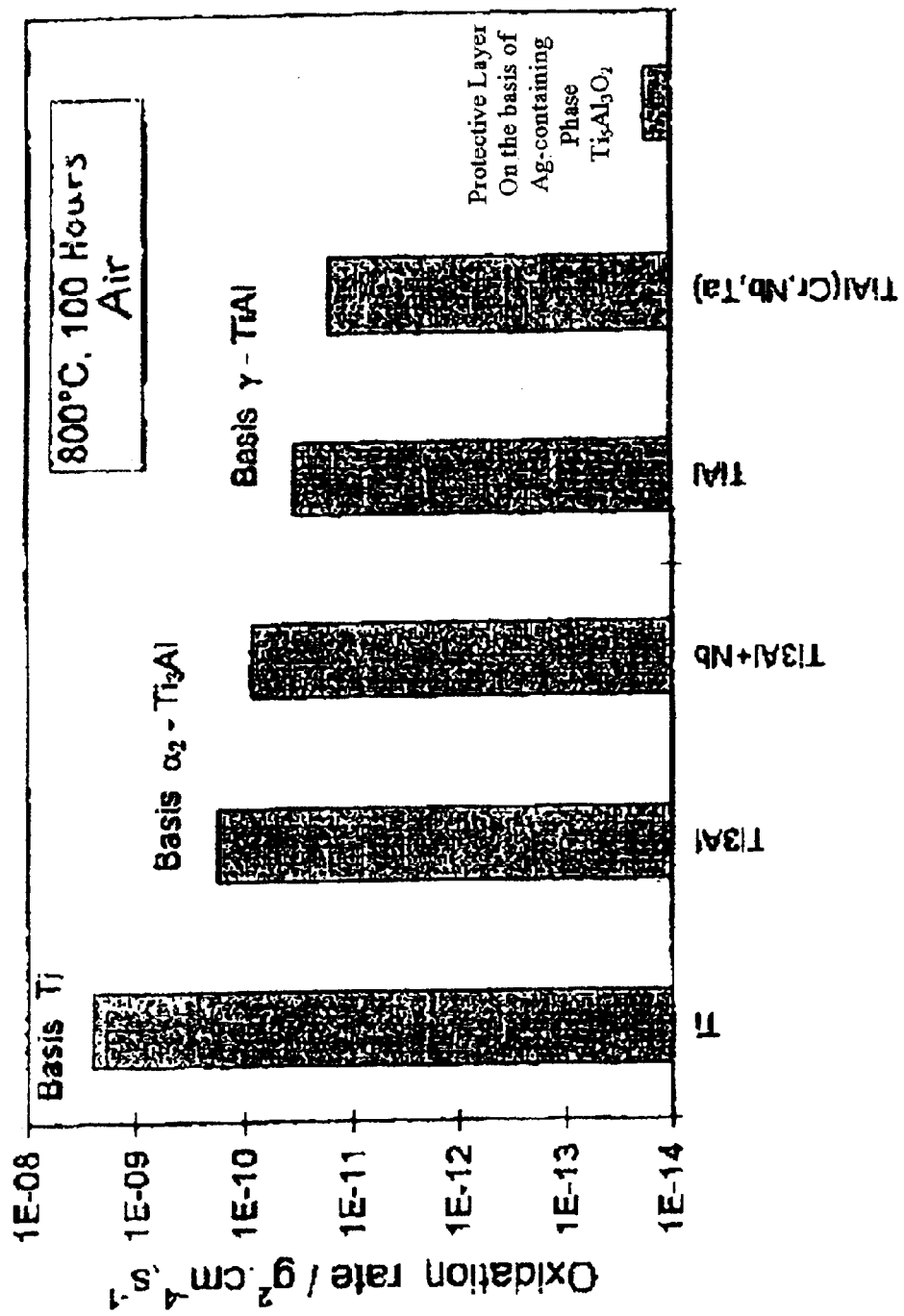
FIG. 1 shows typical values for the oxidation rates of the protective layer according to the invention on the basis of the Ag-containing ternary phase Ti$_5$Al$_3$O$_2$ during storage in air at 800° C. in comparison with values for titanium, for intermetallic phases of the type α$_2$—Ti$_3$Al and for intermetallic phases of the type γ-TiAl.
Figure 2A:
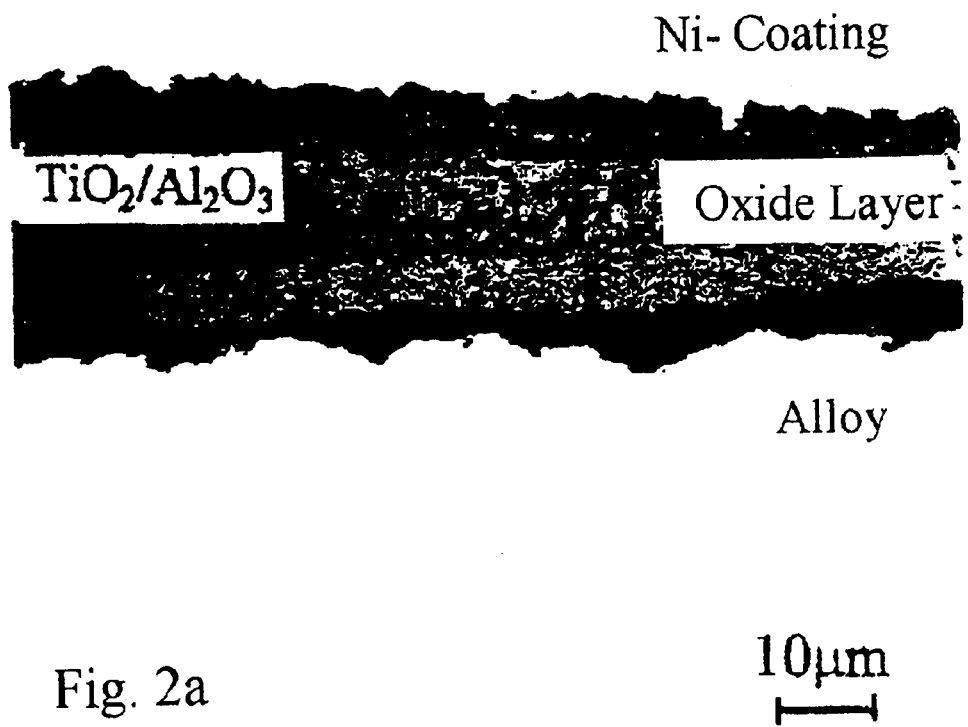
FIGS. 2a and 2b show metallographic cross-sections for a comparison of the thickness of oxidic cover layers on the basis of different materials after storage in air at 800° C.
Figure 2B:
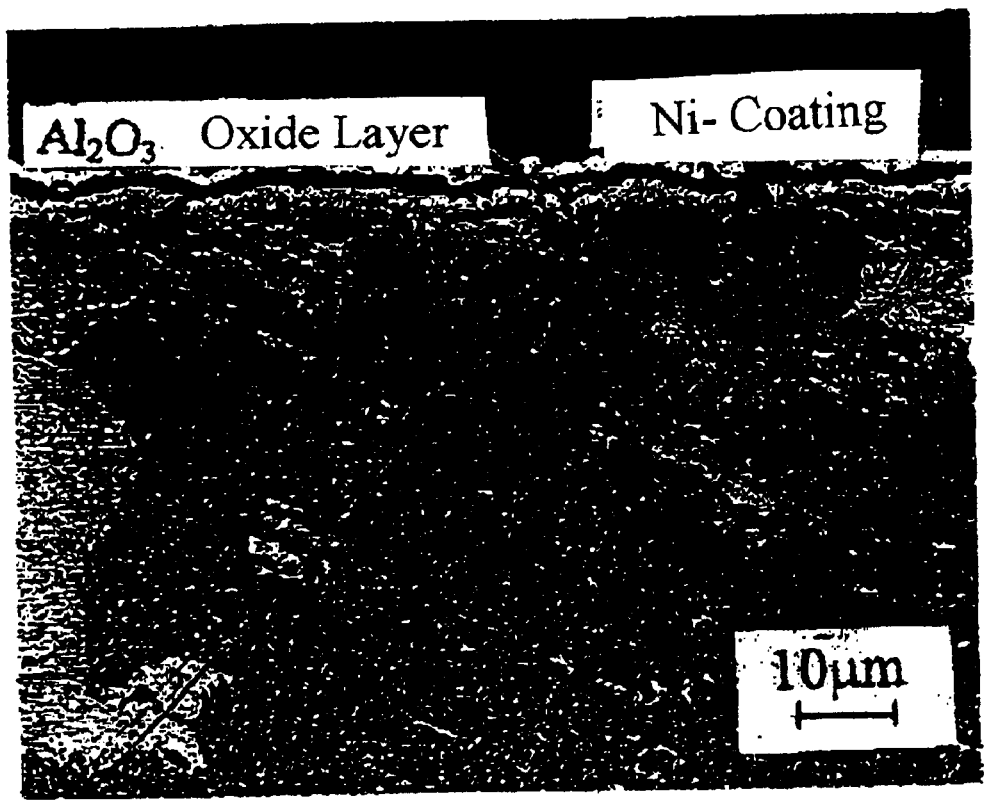

What is claimed is:

1. A method of producing on the surfaces of a component, which consists of one of a titanium alloy and an intermetallic phase on the basis of titanium and has an Al content of 40–60 at %, a protective layer having a composition according to the formula Ti$_{5.0-x}$Ag$_{x+y}$Al$_{3.0-y}$O$_2$ with 0.05<x+y<1.0, said method comprising the steps of applying a silver coating to the surface of said component and heating the component with said silver coating in vacuum or a protective gas atmosphere to temperatures above 700° C. to form said protective layer on said component.

2. A method according to claim 1, wherein said silver coating has a thickness of 2 to 200 μm.

3. A method according to claim 1, wherein said component with the silver coating disposed thereon is heat treated for a period of 1 to 24 hours.

* * * * *